United States Patent
Wieber et al.

(10) Patent No.: US 9,745,200 B2
(45) Date of Patent: Aug. 29, 2017

(54) PROCESS FOR PREPARING HIGHER HALOSILANES AND HYDRIDOSILANES

(75) Inventors: Stephan Wieber, Karlsruhe (DE); Matthias Patz, Bottrop (DE); Harald Stueger, Graz (AT); Christoph Walkner, Graz (AT)

(73) Assignee: Evonik Degussa GmbH, Essen (DE)

( * ) Notice: Subject to any disclaimer, the term of this patent is extended or adjusted under 35 U.S.C. 154(b) by 527 days.

(21) Appl. No.: 13/989,823

(22) PCT Filed: Dec. 2, 2011

(86) PCT No.: PCT/EP2011/071621
§ 371 (c)(1),
(2), (4) Date: May 28, 2013

(87) PCT Pub. No.: WO2012/080003
PCT Pub. Date: Jun. 21, 2012

(65) Prior Publication Data
US 2013/0259790 A1    Oct. 3, 2013

(30) Foreign Application Priority Data
Dec. 14, 2010  (DE) .................. 10 2010 062 984

(51) Int. Cl.
| C01B 33/08 | (2006.01) |
| C01B 33/107 | (2006.01) |
| B01J 31/02 | (2006.01) |
| C01B 33/04 | (2006.01) |
| C01B 33/021 | (2006.01) |

(52) U.S. Cl.
CPC ..... *C01B 33/10773* (2013.01); *B01J 31/0267* (2013.01); *C01B 33/021* (2013.01); *C01B 33/04* (2013.01)

(58) Field of Classification Search
None
See application file for complete search history.

(56) References Cited

U.S. PATENT DOCUMENTS

| 3,322,511 A | 5/1967 | Weyenberg |
| 5,502,230 A | 3/1996 | Mautner et al. |
| 2008/0319214 A1 | 12/2008 | Geisberger et al. |
| 2010/0176338 A1* | 7/2010 | Cannady et al. ......... 252/182.3 |
| 2011/0189072 A1 | 8/2011 | Brausch et al. |
| 2011/0268642 A1 | 11/2011 | Brausch et al. |
| 2012/0205654 A1 | 8/2012 | Stuetzel et al. |
| 2012/0214005 A1 | 8/2012 | Wieber et al. |
| 2012/0263639 A1 | 10/2012 | Brausch et al. |
| 2012/0273805 A1 | 11/2012 | Wieber et al. |
| 2012/0291665 A1 | 11/2012 | Wieber et al. |
| 2013/0168824 A1 | 7/2013 | Wieber et al. |

FOREIGN PATENT DOCUMENTS

| CN | 1126724 A | 7/1996 |
| EP | 2 006 250 | 12/2008 |
| JP | 60 060915 | 4/1985 |
| JP | 62 046916 | 2/1987 |
| JP | 1 122915 | 5/1989 |
| WO | 2008 051328 | 5/2008 |
| WO | 2012 028476 | 3/2012 |
| WO | 2012 041837 | 4/2012 |
| WO | 2012 055693 | 5/2012 |
| WO | 2012 072401 | 6/2012 |
| WO | 2012 072403 | 6/2012 |
| WO | 2012 072406 | 6/2012 |
| WO | 2012 080003 | 6/2012 |
| WO | 2012 084897 | 6/2012 |
| WO | 2012 0130620 | 10/2012 |

OTHER PUBLICATIONS

U.S. Appl. No. 14/435,528, filed Apr. 14, 2015, Traut, et al.
A. Kaczmarczyk et al., "The Preparation and Some Properties of a New Pentasilicon Dodecachloride, $Si_5Cl_{12}$", J. Inorg. Nucl. Chem., vol. 26, 1964, pp. 421 to 425.
International Search Report Issued Apr. 3, 2012 in PCT/EP11/71621 Filed Dec. 2, 2011.
U.S. Appl. No. 13/824,641, filed Mar. 18, 2013, Wieber, et al.
U.S. Appl. No. 13/991,261, filed Jun. 3, 2013, Stenner, et al.
U.S. Appl. No. 13/885,316, filed May 14, 2013, Stenner, et al.
U.S. Appl. No. 13/991,986, filed Jun. 6, 2013, Brausch, et al.
Cristina Garcia-Escomel, et al., "Catalytic cleavage of the Si-Si bond of methylchlorodisilanes with nucleophiles: evidences for a stabilised silylene reaction intermediate" Inorganica Chimica Acta, vol. 350, 2003, pp. 407-413.

\* cited by examiner

*Primary Examiner* — Matthew E Hoban
*Assistant Examiner* — Anita Nassiri Motlagh
(74) *Attorney, Agent, or Firm* — Oblon, McClelland, Maier & Neustadt, L.L.P.

(57) ABSTRACT

The invention relates to a process for preparing higher halosilanes by disproportionation of lower halosilanes. The invention further relates to a process for preparing higher hydridosilanes from the higher halosilanes prepared by disproportionation. The invention further relates to mixtures containing at least one higher halosilane or at least one higher hydridosilane prepared by the process described. Finally, the invention relates to the use of such a mixture containing at least one higher hydridosilane for producing electronic or optoelectronic component layers or for producing silicon-containing layers.

13 Claims, No Drawings

PROCESS FOR PREPARING HIGHER HALOSILANES AND HYDRIDOSILANES

CROSS REFERENCE TO RELATED APPLICATIONS

The present application is a 35 U.S.C. §371 national stage patent application of International patent application PCT/EP11/071621, filed on Dec. 2, 2011, the text of which is incorporated by reference, and claims the benefit of the filing date of German Patent Application No. 102010062984.7, filed on Dec. 14, 2010, the text of which is also incorporated by reference.

The invention relates to a process for preparing higher halosilanes by disproportionating lower halosilanes. The invention further relates to a process for preparing higher hydridosilanes from the higher halosilanes prepared by disproportionation. The invention additionally relates to mixtures comprising at least one higher halosilane or at least one higher hydridosilane prepared by the processes specified. The invention finally relates to the use of such a mixture comprising at least one higher hydridosilane for production of electronic or optoelectronic component layers or for production of silicon-containing layers.

Hydridosilanes and mixtures thereof are described in the literature as possible reactants for the generation of silicon layers. Hydridosilanes are understood to mean compounds which contain essentially only silicon and hydrogen atoms. Hydridosilanes may be gaseous, liquid or solid and are—in the case of solids—essentially soluble in solvents such as toluene or cyclohexane, or in liquid silanes such as cyclopentasilane. Examples include monosilane, disilane, trisilane, cyclopentasilane and neopentasilane. Hydridosilanes having at least three or four silicon atoms may have a linear, branched or (optionally bi-/poly-)cyclic structure with Si—H bonds, and can be described by the particular generic formulae $Si_nH_{2n+2}$ (linear or branched; where n≥2), $Si_nH_{2n}$ (cyclic; where n≥3) or $Si_nH_{2(n-i)}$ (bi- or polycyclic; n≥4; i={number of cycles}−1).

Many processes for preparing hydridosilanes are based on a dehydropolymerization reaction of lower hydridosilanes, especially $SiH_4$, to higher silanes with formal $H_2$ elimination. The dehydropolymerization reaction can be performed 1) thermally (U.S. Pat. No. 6,027,705 A in the case that no catalyst is used) and/or 2) by using catalysts such as a) elemental transition metals (heterogeneous catalysis; U.S. Pat. No. 6,027,705 A in the case that platinum group metals, i.e. Ru, Rh, Pd, Os, Ir, Pt, are used; U.S. Pat. No. 5,700,400 A for metals of groups 3B-7B and 8—i.e. the transition metals/lanthanides except the Cu and Zn groups), b) non-metal oxides (heterogeneous catalysis; U.S. Pat. No. 6,027,705 A in the case that $Al_2O_3$ or $SiO_2$ is used), c) hydridic cyclopentadienyl complexes of scandium, yttrium or rare earths (homogeneous catalysis; U.S. Pat. No. 4,965,386 A, 5,252,766 A), d) transition metal complexes (homogeneous catalysis; U.S. Pat. No. 5,700,400 A for complexes of metals of groups 3B-7B and 8—i.e. the transition metals/lanthanides except the Cu and Zn groups; JP 02-184513 A) or e) particular transition metals immobilized on a support (heterogeneous catalysis; U.S. Pat. No. 6,027,705 A in the case that platinum group metals on a support, for example $SiO_2$, are used, U.S. Pat. No. 5,700,400 A for ruthenium, rhodium, palladium or platinum immobilized on carbon, $SiO_2$ or $Al_2O_3$) or transition metal complexes (heterogeneous catalysis, U.S. Pat. No. 6,027,705 A in the case that platinum group metal complexes on a support, for example $SiO_2$, are used). However, all these processes have the disadvantage that the lower hydridosilanes used themselves first have to be prepared in a complicated manner. A further disadvantage of these processes is that they require a high level of apparatus complexity owing to the self-ignitability of the reactants. Finally, it has not been possible to date to achieve sufficiently high yields with these processes. Furthermore, complex purification of the particular target products is required.

Another process for preparing hydridosilanes, in which dihalosilanes are converted by an electrochemical route, optionally together with trihalosilanes and/or tetrahalosilanes, is described, for example, by EP 0 673 960 A1. This process too, however, has the disadvantage that, owing to the electrochemical reaction regime, it requires a high level of apparatus complexity and additionally high energy densities. Finally, the particular di- or trihalosilanes first have to be prepared in a complex manner beforehand here too.

Alternatively, it is also possible to prepare higher hydridosilanes by dehalogenation and polycondensation of halosilanes with alkali metals (GB 2 077 710 A). However, this process does not lead to sufficiently high yields either.

WO 2008/051328 A1 teaches obtaining neopentasilane-containing compositions by reacting a hexahalodisilane of the formula $X_3SiSiX_3$ with a tertiary amine catalyst to form a first mixture comprising tetrakis(trihalosilyl)silane (Si$(SiX_3)_4$) and tetrahalosilane. The two main constituents, tetrakis(trihalosilyl)silane and tetrahalosilane, can be separated from one another. The tetrakis(trihalosilyl)silane obtained can be converted by hydrogenation with diisobutylaluminium hydride to neopentasilane (Si$(SiH_3)_4$). However, this process exhibits the disadvantage that only neopentasilane is obtainable.

DE 102005024041 A1 states that halogenated polysilanes can be formed from halosilanes of the $H_nSiX_{(4-n)}$ to form (X=F, Cl, Br, I; n=0-3) by generating a plasma discharge. This process proceeds under reduced pressure and in moderate yields.

DE 102008042934 A1 teaches that the preparation of neopentasilanes of the Si$(SiR_3)_4$ form (R=H, Cl, Br, I) from $R_3Si$—$(Si)_x$-$SiR_3$ (x=1-5) can be performed in the presence of an ether compound. Only neopentasilanes are obtainable by this process.

It was thus an object of the present invention to remedy the disadvantages of the prior art and to provide a process by which higher halosilanes or mixtures of higher halosilanes can be prepared, which can optionally be converted without any great isolation and/or purification complexity to the corresponding higher hydridosilanes or mixtures of higher hydridosilanes.

This object is achieved by a process for preparing a higher halosilane using at least one halosilane of the generic formula $Si_nX_{2n+2}$ where n≥2 and X=F, Cl, Br and/or I which is converted by disproportionation to a product mixture comprising at least one higher halosilane of the generic formula $Si_mX_{2m+2}$ where m>n and X=F, Cl, Br and/or I and at least one lower halosilane of the generic formula $Si_aX_{2a+2}$ where a=1-2 and X=F, Cl, Br and/or I, characterized in that the reaction is catalysed by at least one tertiary phosphine.

Which halosilane of the generic formula $Si_nX_{2n+2}$ where n≥2 and X=F, Cl, Br and/or I is used, or whether a mixture of silanes which are different but are substituted by the same halogens in each case is used, has minor effects on the composition of the product mixture comprising the at least one higher halosilane and the at least one lower halosilane. For example, $Si_2Cl_6$ and/or $Si_3Cl_8$ and/or $Si_nCl_m$ generally always gives rise to $Si_5Cl_{12}$, $SiCl_4$, higher silanes and possibly, in the case of incomplete conversion, $Si_2Cl_6$ as an intermediate.

The reaction times are within the range of the corresponding amine-catalysed process.

The advantage of the process according to the invention over, for example, amine-catalysed processes is that it is also possible to prepare higher halosilanes or mixtures of higher halosilanes. With amine-catalysed processes, only $Si_8Cl_{12}$ is obtainable.

The catalyst usable in accordance with the invention is a catalyst from the class of the tertiary phosphines. This class of catalysts is novel for the rearrangement reactions of halosilanes.

Preferred tertiary phosphines are selected from the group comprising the tertiary alkylphosphines, e.g. trimethylphosphine, triethylphosphine, tertiary arylphosphines, e.g. triphenylphosphine, tertiary bidentate phosphines and mixtures thereof. Very particular preference is given to tertiary alkylphosphines.

Among tertiary alkylphosphines, particular preference is given especially to trimethylphosphine, since, with trimethylphosphine as the catalyst, the proportion of higher silanes $Si_mX_{2m+2}$ where m>n and X=F, Cl, Br and/or I, as well as $SiX_4$, $Si_2X_6$ and $Si_5X_{12}$, where preferably X=Cl, is particularly high.

The proportion of the at least one catalyst, based on the amount of halosilane used, in the process according to the invention is preferably between 0.001 and 5% by weight.

The disproportionation reaction can be effected in the presence or absence of a solvent. The catalyst may, in the case of presence or absence of a solvent, be used as a pure substance or, in the case of presence of a solvent, as a slurry in a solvent, for example diethyl ether. In the case of use as a slurry, the proportion of the catalyst is preferably between 1 and 25% by weight, based on the total mass of the slurry.

The halosilanes used in the process according to the invention are compounds which consist essentially only of silicon atoms and halogen atoms (halogen=fluorine, chlorine, bromine, iodine) and which have at least two silicon atoms. Halosilanes of the generic formula $Si_nX_{2n+2}$ having at least three or four silicon atoms may have a linear or branched structure.

Of particularly good usability for the process according to the invention are linear halosilanes of the generic formula $Si_nX_{2n+2}$.

Preferably, the at least one halosilane of the generic formula $Si_nX_{2n+2}$ is a compound selected from the group of the hexahalodisilanes, octahalotrisilanes and decahalotetrasilanes, i.e. a compound selected from $Si_2X_6$, $Si_3X_6$, $Si_4X_{10}$ where each X=F, Cl, Br and/or I. It is also possible to use a mixture of one or more of these compounds.

Very particular preference is given to octahalotrisilanes. Among these compounds, particular preference is given in turn to octafluorotrisilane, octachlorotrisilane, octabromotrisilane and octaiodotrisilane, i.e. the compounds of the generic formula $Si_3X_8$ where X=F, Cl, Br or I. Very particular preference is given to using octachlorotrisilane for the process according to the invention.

The proportion of the at least one halosilane in the reaction mixture used in the process is preferably at least 60% and more preferably at least 80% by weight, based on the total mass of the reaction mixture. Most preferably, the reaction mixture comprises only the at least one catalyst and the halosilane(s).

In the process according to the invention, it is possible to use one halosilane or a plurality of halosilanes. Preference is given to using only one halosilane. When a plurality of halosilanes is used, at least one halosilane is preferably present as an octahalotrisilane in a proportion of at least 20% and preferably at least 80% by weight, based on the mixture of halosilanes.

After the formation of the product mixture comprising at least one higher halosilane of the generic formula $Si_mX_{2m+2}$ where m>n and X=F, Cl, Br and/or I and at least one lower halosilane of the generic formula $Si_aX_{2a+2}$ where a=1-2 and X=F, Cl, Br and/or I, this mixture can be hydrogenated to form a hydridosilane of the generic formula $Si_mH_{2m+2}$. The hydrogenation can be effected without further purification or isolation of the higher halosilanes.

$SiCl_4$ and/or $Si_2Cl_6$ should be removed from the product mixture if a subsequent hydrogenation is to be performed, since $SiH_4$ and/or $Si_2H_6$ otherwise form, which constitute a considerable safety risk. Preferably, the tetrahalosilane and/or hexahalodisilane formed is removed from the higher halosilane of the generic formula $Si_mX_{2m+2}$ formed before the hydrogenation. More preferably, this is done by distillative removal or drawing off at temperatures of −30 to +100° C., preferably from −30 to +57° C., and pressures of 0.01 to 1013 mbar, preferably 0.02 to 0.2 mbar, from the product mixture. If required, $Si_5Cl_{12}$ can also be sublimed off, but this is unnecessary for any subsequent hydrogenation, at least for safety reasons.

The catalyst used is generally added in very small amounts, such that there is generally no need for removal from the mixture.

The hydrogenation is preferably effected by adding at least one hydrogenating agent selected from the group of the metal hydrides of a metal of main groups 1 to 3 (especially alkali metal or alkaline earth metal hydrides) or the group of the hydridic compounds consisting of $LiAlH_4$, $NaBH_4$, $iBu_2AlH$.

Hydridosilanes preparable by the process according to the invention are also understood to mean compounds which contain essentially only silicon and hydrogen atoms. These hydridosilanes may be gaseous, liquid or solid and are—in the case of solids—essentially soluble in solvents such as toluene or cyclohexane, or in liquid silanes such as cyclopentasilane. Examples include disilane, trisilane, cyclopentasilane and neopentasilane. These hydridosilanes too may have a linear or branched structure with Si—H bonds. The process according to the invention is particularly suitable for preparing branched hydridosilanes. More particularly, it is especially suitable for preparation of neopentasilane or high oligomers of hydridosilanes, according to the catalyst used.

In the hydrogenation, the hydrogenating agent is present in a 2- to 30-fold and preferably 10- to 15-fold molar excess, based on the halosilane used.

The hydrogenation can also be effected in the presence or absence of a solvent. Preference is given to performing the hydrogenation without solvent. When, though, hydrogenation is effected in the presence of a solvent, solvents useable with preference may be selected from the group consisting of linear, branched and cyclic, saturated, unsaturated and aromatic hydrocarbons having one to 12 carbon atoms and ethers. Particular preference is given to n-pentane, n-hexane, n-heptane, n-octane, n-decane, dodecane, cyclohexane, cyclooctane, cyclodecane, dicyclopentane, benzene, toluene, m-xylene, p-xylene, mesitylene, tetrahydronaphthalene, decahydronaphthalene, diethyl ether, dipropyl ether, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, tetrahydrofuran, p-dioxane, acetonitrile.

Particularly efficiently useable solvents are the hydrocarbons n-pentane, n-hexane, n-hexane, n-octane, n-decane, dodecane, cyclohexane, cyclooctane, cyclodecane, benzene, toluene, m-xylene, p-xylene, mesitylene. Further solvents may be alkylaluminium halides of the $AlR_2Hal$ form (Hal=F, Cl, Br, I; R=alkyl, aryl), where the melting point should be <100° C. The solvent may make up 0.01 to 90% by weight of the total mass.

The halosilane of the generic formula $Si_mX_{2m+2}$ is preferably hydrogenated at temperatures of −78 to 300° C. and pressures of 500 mbar to 5 bar. Particular preference is given to effecting the hydrogenation at −10 to 30° C. and 900 to 1100 mbar.

The hydrogenated halosilanes formed can be purified, for example, by a condensation or distillation. A further purification may preferably be a purification with nonalkaline, degassed—i.e. especially $O_2$-free—water. Such purification methods are common knowledge to those skilled in the art.

The invention further provides the halosilanes prepared by the process described above, or mixtures comprising at least one higher halosilane and the hydridosilanes prepared therefrom, or mixtures comprising at least one higher hydridosilane.

The invention likewise provides for the use of a mixture comprising at least one higher hydridosilane for production of electronic or optoelectronic component layers or for production of silicon-containing layers, preferably elemental silicon layers, the mixture having been produced by the process described above.

Finally, the invention also provides for the use of tertiary phosphines, preferably selected from the group comprising tertiary alkylphosphines, tertiary arylphosphines, tertiary bidentate phosphines and mixtures thereof, in the preparation of higher halosilanes. Particular preference is given to the use of these phosphines, e.g. trimethylphosphine, triethylphosphine, triphenylphosphine or mixtures thereof, as a catalyst for the disproportionation of halosilanes of the generic formula $Si_nX_{2n+2}$ where n≥2 and X=F, Cl, Br and/or I, in the preparation of higher halosilanes of the generic formula $Si_mX_{2m+2}$ where m>n and X=F, Cl, Br and/or I.

EXAMPLES

Example 1

Disproportionation: 10.2 g (0.028 mol) of octachlorotrisilane were admixed at room temperature, while stirring, 16.3 mg ($2.1×10^{−4}$ mol; 0.75 mol %) of trimethylphosphine $PMe_3$ in 0.2 ml of diethyl ether. After stirring at room temperature overnight and removal of the volatile constituents (diethyl ether, $Si_2Cl_6$, $SiCl_4$) from the resulting clear solution at 40° C. under reduced pressure (0.05 mbar), the product remains as an oily liquid which was identifiable by means of $^{29}Si$ NMR spectroscopy as a mixture of oligochlorosilanes of different chain length. Yield: 5.3 g.

Hydrogenation: 5.3 g of the resulting oligochlorosilane mixture were dissolved in 70 ml of toluene and admixed, while cooling with ice, gradually with 30 ml of a 2.1M solution of $LiAlH_4$ in diethyl ether. Subsequently, the mixture was stirred at room temperature overnight. The reaction mixture was worked up with 150 ml of degassed 10% $H_2SO_4$ and the organic phase was dried with $Na_2SO_4$. After removal of the volatile constituents from the resulting clear solution at 40° C. under reduced pressure (0.05 mbar), the product remains as an oily liquid, which was identifiable by means of $^1H$ and $^{29}Si$ NMR spectroscopy as a mixture of higher hydridosilanes of different chain length. An analysis of the resulting product by means of GPC gave the following results: Mn=450 g/mol; Mw=580 g/mol; Mw/Mn=1.289. Yield: 0.8 g.

The invention claimed is:

1. A process for preparing a higher halosilane, the process comprising:
    converting at least one halosilane of formula:

$Si_nX_{2n+2}$, by disproportionation to a product mixture comprising at least one higher halosilane of formula:

$Si_mX_{2m+2}$, and at least one lower halosilane of formula:

$Si_aX_{2a+2}$, wherein n is equal to or larger than 2;
    m is larger than n;
    a is 1 or 2; and
    X is F, Cl, Br, I, or a combination thereof, and
    wherein a reaction is catalysed by at least one tertiary phosphine,
    wherein the at least one halosilane is selected from the group consisting of $Si_2X_6$, $Si_3X_8$, and $Si_4X_{10}$.

2. The process according to claim 1, wherein the at least one tertiary phosphine is at least one selected from the group consisting of a tertiary alkylphosphine, a tertiary arylphosphine, and a tertiary bidentate phosphine.

3. The process according to claim 2, wherein the at least one tertiary phosphine is at least one selected from the group consisting of trimethylphosphine, triethylphosphine, and triphenylphosphine.

4. The process according to claim 1, wherein the at least one halosilane is a linear silane.

5. The process according to claim 1, further comprising:
    hydrogenating the at least one higher halosilane, thereby obtaining the at least one higher hydridosilane of formula $Si_mH_{2m+2}$.

6. The process according to claim 5, further comprising:
    removing the at least one lower halosilane from the product mixture prior to the hydrogenating.

7. The process according to claim 5, wherein the hydrogenating is effected by adding at least one hydrogenating agent selected from the group consisting of a metal hydride of a metal of main groups 1 to 3 and a hydridic compound comprising $LiAlH_4$, $NaBH_4$, or $iBu_2AlH$.

8. The process according to claim 7, wherein the hydrogenating agent is present in a 2- to 30-fold molar excess of the at least one halosilane added.

9. The process according to claim 6, wherein the removing is distillative removing or drawing off at a temperature of from −30 to +100° C. and a pressure of from 0.01 to 1013 mbar prior to the hydrogenating.

10. The process according to claim 8, wherein the hydrogenating agent is present in a 10- to 15-fold molar excess of the at least one halosilane added.

11. A method for producing at least one higher halosilane, comprising:
    producing the at least one higher halosilane with at least one tertiary phosphine.

12. The method according to claim 11, wherein the at least one tertiary phosphine is at least one selected from the group consisting of a tertiary alkylphosphine, a tertiary arylphosphine, and a tertiary bidentate phosphine.

13. The process according to claim 1, which is conducted at room temperature.

* * * * *